United States Patent [19]
Hashimoto

[11] 3,903,759
[45] Sept. 9, 1975

[54] CONTROL SYSTEM FOR AUTOMATIC TRANSMISSIONS

[75] Inventor: Masanao Hashimoto, Toyota, Japan

[73] Assignee: Toyota Jidosha Kogyo Kabushiki Kaisha, Aichi, Japan

[22] Filed: July 25, 1973

[21] Appl. No.: 382,555

[30] Foreign Application Priority Data
July 28, 1972 Japan.............................. 47-75043

[52] U.S. Cl. .................... 74/866; 74/869; 74/752 D
[51] Int. Cl. ...................... B60r 21/02; F16h 57/10
[58] Field of Search................... 74/866, 752 D, 869

[56] References Cited
UNITED STATES PATENTS

| | | | |
|---|---|---|---|
| 3,724,293 | 4/1973 | Wakamatsu et al. ................ | 74/866 |
| 3,726,157 | 4/1973 | Marumo ......................... | 74/869 X |
| 3,727,488 | 4/1973 | Wakamatsu et al. ................ | 74/866 |
| 3,797,330 | 3/1974 | Ushijuma........................ | 74/886 X |

*Primary Examiner*—Samuel Scott
*Assistant Examiner*—P. S. Lall
*Attorney, Agent, or Firm*—Toren, McGeady and Stanger

[57] ABSTRACT

The disclosed control system actuates predetermined combinations of hydraulic valves which establish the desired gear ratios in a four-forward one-reverse speed transmission of a vehicle. In the control system, a selector selects the desired operating condition, such as drive, reverse, etc., of the transmission. A first sensor arrangement senses the speed of the vehicle and produces corresponding speed signals. A second sensor arrangement responds to the selector and produces operating signals corresponding to the selected conditions. A logic system responds to the signals and, on the basis of the speed and selected conditions, produces electrical indications which represent those valves that must be energized to establish the particular gear ratios that are necessary for operating in the selected conditions. Thus, for example, when the drive condition has been selected, the logic system determines which gear ratio is desired for the particular speed and produces indications selecting the particular valves to be actuated. Driver means then actuate the valves to obtain the resulting gear ratio. The logic system also responds to the extent to which the throttle is opened.

8 Claims, 4 Drawing Figures

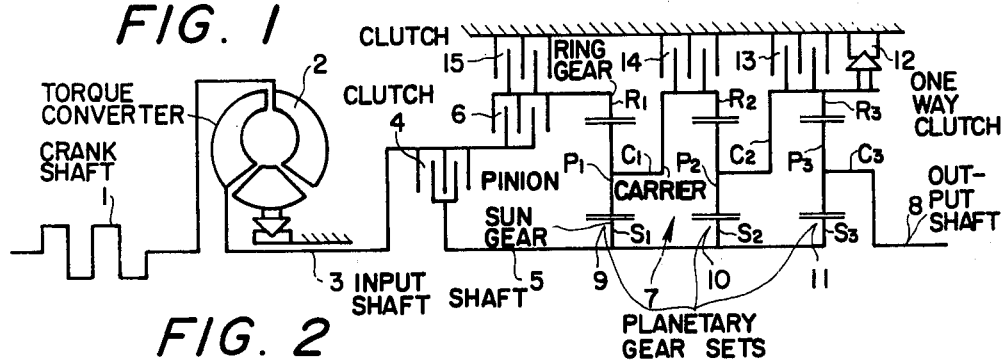
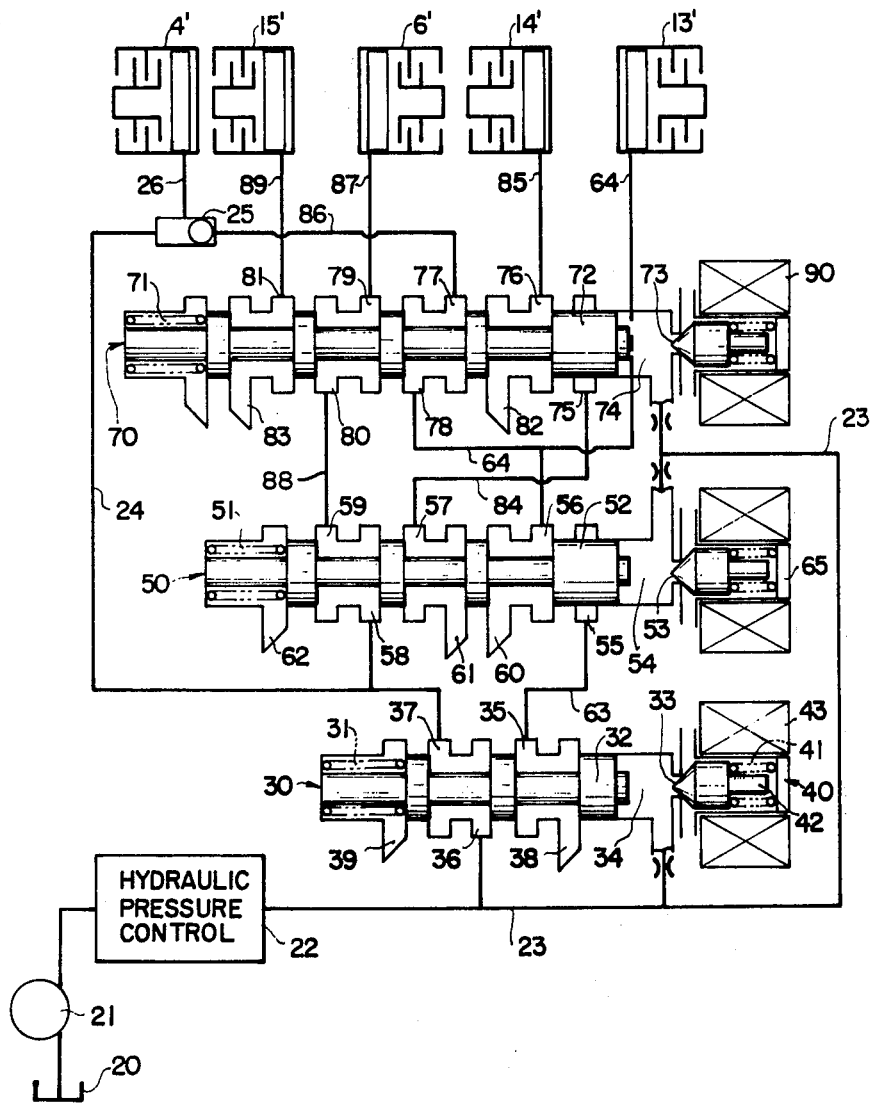

CONTROL SYSTEM FOR AUTOMATIC TRANSMISSIONS

BACKGROUND OF THE INVENTION

This invention relates to automatic power transmissions, and more particularly to a control for automatic power transmissions.

In conventional hydraulic control systems for automatic automobile transmissions, a shift lever is coupled to an elongated manual valve through a mechanical mechanism such as a linkage to selectively control a hydraulic circuit in dependence upon a desired gear ratio or range. An oil line transmits the hydraulic pressure to a shift valve so that the latter may be controlled directly by hydraulic pressure corresponding to the vehicle speed and throttle opening. This requires a large number of both directional control valves and oil lines. The resulting hydraulic circuit is very complex. Moreover, hazardous projections such as a shift lever extend into the driver's compartment.

An object of the present invention is to overcome the above problems.

Another object of the invention is to improve hydraulic control systems for transmissions.

Another object of the present invention is to permit elimination of the shift lever and the mechanical linkage system.

Yet another object of the invention is to simplify the hydraulic circuit and effect gear shift control with a high degree of accuracy, while reducing the power consumption.

SUMMARY OF THE INVENTION

According to a feature of the invention these objects are obtained, in whole or in part, by controlling three electrical servo valves in response to electrical signals representing a vehicle speed and a throttle opening. This permits operation of the transmission in seven ranges, that is, four forward gears, one reverse gear, neutral, and first gear with engine braking. These and other features of the invention are pointed out in the claims. Other objects and advantages of the invention will become evident from the following detailed description when read in light of the accompanying drawings.

BRIEF DESCRIPTION OF THE DRAWINGS

FIG. 1 is a schematic diagram illustrating a four-forward speed automatic transmission which is controlled according to features of the invention;

FIG. 2 is a diagram of a hydraulic control circuit of a control system embodying features of the present invention;

DESCRIPTION OF PREFERRED EMBODIMENTS

Figure 3:
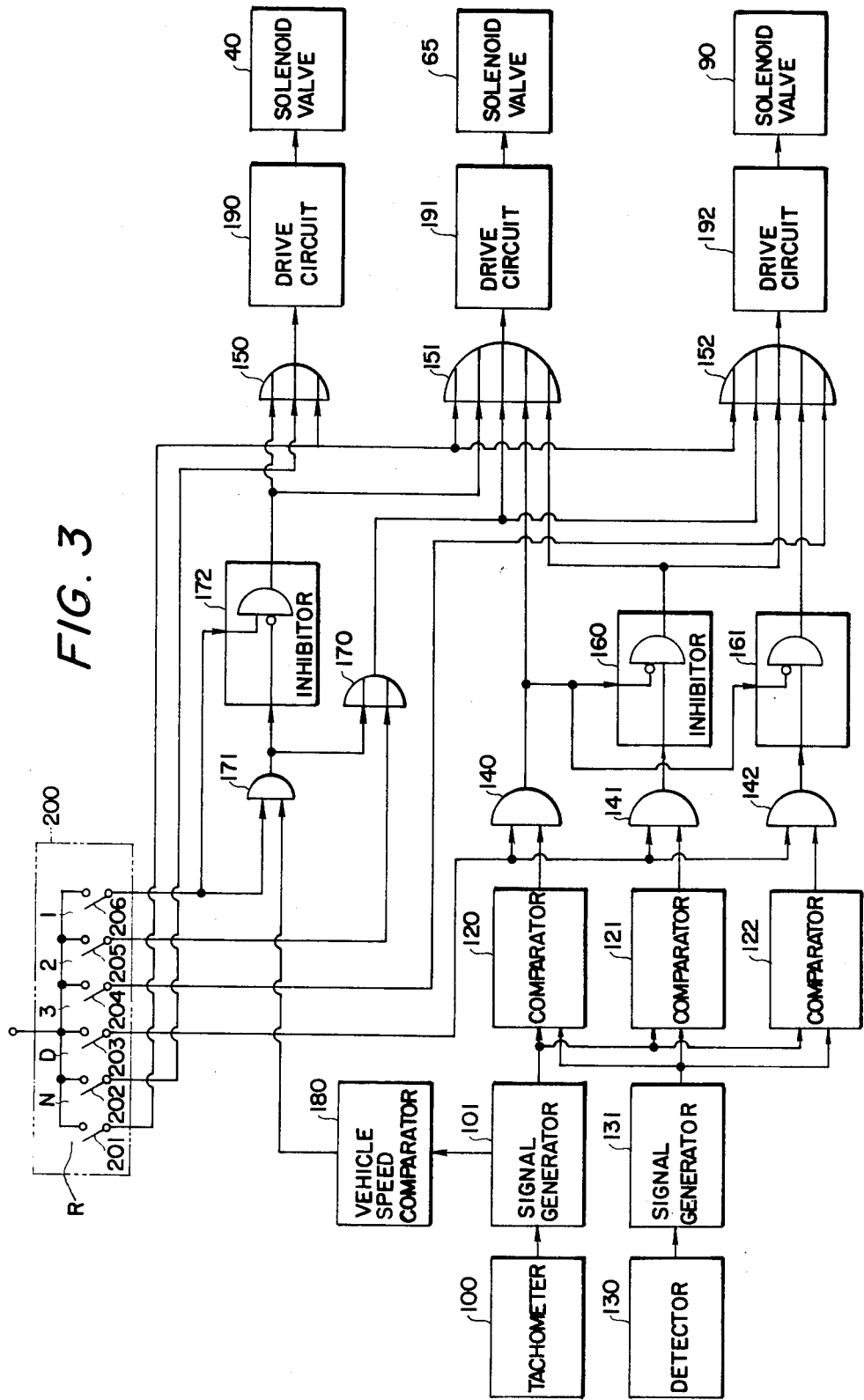
FIG. 3 is a block diagram of an electronic control circuit of the control system embodying features of the invention.

FIG. 1 illustrates an automatic torque converter transmission with four forward speeds and one reverse speed. A crank shaft 1 is coupled through a torque converter 2 to an input shaft 3 which, in turn, is coupled through a front clutch 4 intermediate to shaft 5 and to a fourth clutch 6. A gear section 7 couples the intermediate shaft 5 and fourth clutch 6 to an output shaft 8.

The gear section 7 includes three planetary gear sets 9, 10, and 11. Set 9 is composed of a sun gear S1, a pinion P1, a ring gear R1, and a carrier or cage C1. The set 10 includes a sun gear S2, a pinion P2, a ring gear R2, and a carrier C2. The set 11 is composed of a sun gear S3, a pinion P3, a ring gear R3, and a carrier C3.

The sun gears S1 to S3 are coupled to the intermediate shaft 5. The ring gear R3 of the first planetary gear set 9 is coupled to the fourth clutch 6. The carrier C1 of the first planetary gear set 9 is coupled to the ring gear R2 of the second planetary gear set 10; the carrier C2 of the second planetary gear set 10 is coupled to the ring gear R3 of the third planetary gear set 11, and the carrier C3 of the third planetary gear set 11 is coupled to the output shaft 8. The ring gear R3 of the third planetary gear set 11 is coupled to a one-way clutch 12 and to a first and reverse clutch 13. The ring gear R3 of the second planetary gear set is coupled to a second clutch 14, and the ring gear R1 of the first planetary gear set 9 is coupled to a third clutch 15.

The torque converter 2 transmits the power of the engine to the input shaft 3. When the front clutch 4 is not engaged, no power is transmitted from the input shaft to the output shaft so that the automatic transmission is in the neutral position. When the front clutch 4 is engaged, the intermediate shaft *t* is transmits power to all of the sun gears S1 to S3 so that the automatic transmission is in the forward speed condition.

When the ring gear R3 of the third planetary gear 11 is applied by the one-way clutch 12, the sun gear S3 and the pinion P3 place the output shaft 8 in first gear. The one-way clutch freewheels when the output shaft 8 is rotated in the reverse direction so that no engine braking is provided. However, the first and reverse clutch 13 locks the ring gear R3 when the output shaft 8 is rotated in the reverse direction so that the first gear is provided with engine braking.

When the second clutch 14 locks the ring gear R2, the system is in second gear in which the rotational speed is increased by the rotational speed of the carrier C2 from the first gear. When the third clutch 15 locks the ring gear R1, the system is placed in third gear, the rotational speed being increased by the rotation of the speed carrier C1 from the second gear. When the fourth clutch 6 transmits power to the ring gear R1 of the first planetary gear set 9, the entire gear section 7 is locked together to transmit power directly from the converter to the output shaft without speed reduction so as to place the system in fourth gear. Actuation of the fourth clutch 6 while the front clutch 4 is released transmits power from the input shaft 3 to the ring gear 1 of the first planetary gear set 9 to rotate the intermediate shaft 5 in reverse gear. The first and reverse clutch 13 locks both the ring gear R3 and the carrier C2 so as to retard rotation of the carrier C1 and rotate the output shaft in the reverse direction at a reduced speed.

The gear shifts are summarized in the following table where O indicates that the clutches are engaged.

Table 1

|  | 4 | 14 | 15 | 6 | 13 | 12 |
|---|---|---|---|---|---|---|
| first gear with engine braking | O |  |  |  | O |  |
| first gear | O |  |  |  |  | O |
| second gear | O | O |  |  |  |  |
| third gear | O |  | O |  |  |  |

Table 1-Continued

|  | 4 | 14 | 15 | 6 | 13 | 12 |
|---|---|---|---|---|---|---|
| fourth gear | 0 |  |  | 0 |  |  |
| neutral |  |  |  |  |  |  |
| reverse |  |  |  |  | 0 | 0 |

FIG. 2 illustrates a hydraulic control circuit forming part of the control system for the automatic transmission of FIG. 1. Here, hydraulic servos 4', 6', 13' 14', and 15' actuate the clutches 4, 6, and 13 to 15 respectively In the hydraulic control system, a hydraulic pressure control device 22 controls the hydraulic pressure of operating oil pumped from an oil reservoir 20 by a pump 21. Three shift valves 30, 50, and 70 selectively change the hydraulic circuits to the hydraulic servos 4', 6', and 13' to 15'. Solenoid valves 40, 65, and 90 selectively actuate the shift valves 30, 50, and 70 in response to the electrical signals.

In the first shift valve 30, a spring 31 biases a spool 32 to the right. An orifice 33, when opened, allows oil under pressure to leave a chamber 34 whose pressure ultimately controls flow of oil at ports 35, 36, and 37 as well as discharge ports 38 and 39. The oil chamber 34 and the port 36 communicate with the pressure control device 22 through a line 23. The port 37 communicates with the first port of a directional control valve 25 through a line 24.

A first solenoid valve 40 actuates the first shift valve 30. In the valve 40, a spring 41 biases a plunger 42 to the left so as to close the orifice 33. A coil 43, when actuated, moves the plunger 42 backwards to the right against the force of the spring 41. When the coil is not energized, as shown in FIG. 2, the pressure in the hydraulic chamber 34 moves the spool 32 to the left against the force of the spring 31. The port 35 now communicates with the port 38 and the port 36 communicates with the port 37 as shown in FIG. 2.

When the coil is energized, and the plunger 42 moves to the right, the spring 31 also moves the spool 32 to the right. The port 35 now communicates with the port 36 while the port 37 communicates with the port 39.

In the second shift valve 50 a spring 51 biases a spool 52 to the right. An orifice 53 controls the pressure in a hydraulic chamber 54. The spool 52 controls the flow of fluids in five ports 55 to 59 and three discharge ports 60 to 62. The hydraulic chamber 54 communicates with the line 23. The port 55 communicates with the port 35 of the shift valve 30 to a line 63. The port 56 communicates with the hydraulic servo 13' of the first and reverse clutch. The port 58 communicates with the line 24. A second solenoid valve 65 actuates the second shift valve 50 and is similar to the valve 40. When the valve 65 is not energized, the orifice 53 is closed. The pressure in the chamber 54 then moves the spool to the left so that the ports 56, 57, and 58 communicate with respective ports 60, 61 andd 59 as shown in FIG. 2. When the valve 65 is energized, the reduced pressure in the chamber 54 allows the spring 51 to move the spool to the right. Now the ports 55, 57, and 59 communicates with the respective ports 56, 58, 62.

In the third shift valve 70, a spring 71 biases a spool 72 to the right. An orifice 73 controls the pressure within an oil chamber 74 so that the spool 72 can control the operation of seven ports 75 to 81 and two discharge ports 82 and 83. The oil chamber 74 communicates with the oil line 73. The port 75 communicates with the port 57 of the second shift valve 50 through a line 84. The port 76 communicates with the hydraulic servo 14' of the second clutch through a line 85. The port 77 communicates with the second port of the directional control valve 25 through a line 86. The port 78 communicates with the line 64. The port 79 communicates with the hydraulic servo 6' of the first clutch through a line 87. The port 80 communicates with the port 59 of the second shift valve 50 through a line 88. The port 81 communicates with the hydraulic servo 15' of the third clutch, through a line 89. A third solenoid valve 90 actuates the shift valve 70. The valve 90 is substantially similar in construction to the first solenoid valve 70. The valve 90 is substantially similar on construction to the first solenoid valve 40. When the valve 90 is deenergized, it closes the orifice 73. The hydraulic pressure in the oil chamber 74 moves the spool 72 to the left so that the ports 76, 77, 79, and 81 communicate with the ports 82, 78, 80, and 83, respectively. Energization of the valve 90 opens the orifice 73 and relieves the pressure in the chamber 74. The spring 71 now moves the spool 72 to the right so that ports 75, 77, 78, and 80 communicate respectively with the ports 76, 82, 79, and 81.

The third port of the directional control valve 25 communicates with the servo 4' of the front clutch through the line 26. Hence, either the line 24 or 86 communicates with the line 26. Orifices whose diameters are sufficiently smaller than that of the orifices 33, 53, and 73 of the hydraulic chambers 34, 54, and 74 are interposed between the chambers 34, 54, and 74 and the line 23 so as to prevent pressure drops in the line 23 and to allow the hydraulic pressures in the chambers 34, 54, and 74 to be sufficiently reduced when the solenoid valves are energized.

Table 2 illustrates the relationship between the gears and the valves in the systems of FIGS. 1 and 2. The symbol O indicates that the solenoid listed on the first line is energized to obtain the gear conditions listed on the left. Thus, to obtain second gear, solenoid valves 65 and 90 are energized.

Table 2

|  | 40 | 65 | 90 |
|---|---|---|---|
| First gear with engine braking | 0 | 0 |  |
| first gear |  | 0 |  |
| second gear |  | 0 | 0 |
| third gear |  |  | 0 |
| fourth gear |  |  |  |
| neutral | 0 |  |  |
| reverse | 0 | 0 | 0 |

In the neutral position the solenoid 40 is energized as indicated on the table 2. This moves the plunger 42 and the spool 32 to the right.

The automatic transmission is put into the forward position when the reverse solenoid valve 40 is deenergized so that the hydraulic pressure in the line 23 is transmitted to the hydraulic servo 4' through the ports 36 and 37 of the first shift valve 30, the line 24, the directional control valve 25 and the line 26. Thereafter the system switches into the first gear by energizing the solenoid valve 65. The hydraulic pressure transmitted from the shift valve 50 through the line 24 to the line 84 is interrupted by the spool land of the shift valve 70 which closes the port 75 when the third solenoid valve 90 is deenergized. when the third solenoid valve 90 is energized so that the hydraulic pressure in the line 84 is transmitted through the ports 75 and 76 of the third shift valve 70 and the line 85 to the hydraulic servo 14' the system shifts to second gear.

The system shifts to third gear when the second solenoid valve is deenergized so that the hydraulic pressure in the line 24 is transmitted to the line 87 through the ports 58 and 59 of the second shift valve 50. At the same time, the hydraulic pressure in the line 88 is transmitted to the hydraulic servo 15' through the hydraulic circuit composed of ports 80 and 81 and the line 89 which is established when the third solenoid valve is energized. The hydraulic servo 14' is discharged through the ports 57 and 61 of the second shift valve 50.

The system is placed in fourth gear as indicated by FIG. 2 when all the valves are deenergized. When the third solenoid valve 90 is deenergized, it transmits the hydraulic pressure in the line 88 to the hydraulic servo 6' through the ports 80 and 79 of the third shift valve 70 and the line 87. Oil in the hydraulic servo 15' is discharged through the ports 81 and 83 of the third shift valve 70.

As indicated in table 2, first gear with engine braking is obtained when the first solenoid valve 40 and the second solenoid valve 65 is energized. Operation of the first solenoid valve 40 transmits the hydraulic pressure in the line 23 to the line 63 through the ports 36 and 35 of the first shift valve 30. Energization of the second solenoid valve 65 transmits the hydraulic pressure to the hydraulic servo 13' through the ports 55 and 56 of the shift valve 50 and the line 64. The hydraulic pressure is transmitted to the hydraulic servo 4' through the ports 78 and 88, the directional control valve 25, and the line 26.

Reverse gear is obtained when all three solenoid valves 40, 65, and 90 are energized. Energization of the first and second solenoid valves 40 and 65 causes the hydraulic pressure to be transmitted to the hydraulic servo 13'. Energization of the third solenoid valve 90 causes the hydraulic pressure in the line 64 to be transmitted to the hydraulic servo 6' through the line 87. Actuation of the hydraulic servos 6' and 13' results in engagement of the clutches 6 and 13 which, as indicated in page 1, places the system in reverse gear.

As previously stated, deenergization of the second solenoid valve 65 causes the system to operate in neutral. The hydraulic pressure in the line 63 is interrupted by the spool land of the shift valve 50.

FIG. 3 illustrates an electronic control system for controlling the three solenoid valves 40, 65, and 90. Here, a tachometer 100 or the like detects the speed of a wheel or the vehicle. A signal generator 101 connects the tachometer 100 to three comparators 120, 121, and 122. A detector 130 detects the degree which a throttle is opened. A signal generator 131 connects the output of the detector 130 to the three comparators 120, 121, and 122. The comparators 120 to 122 compare the signals representing the vehicle speed in the throttle opening generated by the signal generators 101 and 131 respectively.

In the first gear or range, the comparator 120 produces a signal 1. In the first and second gears or ranges, the second comparator 121 produces a signal 1. In the range less than the third gear or range, the comparator 122 produces a signal 1.

A gear shift selector 200 disposed at a driver's seat has six contacts 201 to 206 which can be turned on and off manually by a lever or dial. The first contact 201 is closed in order to place the vehicle in reverse gear (R range). Closing of the second contact 202 shifts the vehicle to neutral gear (N range). Closing of the third contact 203 shifts the vehicle to the automatic shift range (D range) from first to fourth gear. The fourth contact 204 is closed in order to place the vehicle in third gear only (3rd range). Closing of the fifth contact 205 places the vehicle in second gear (2nd range). The sixth contact 206 is closed in order to place the vehicle in first gear with engine braking (L range).

The third contact 203 is coupled to one of the inputs of each of three AND gates 140, 141, and 142. The other input to the AND gates 140 to 142 arrives from respective comparators 120 to 122. The output of the first AND gate 140 is connected directly to an OR gate 151. The outputs of the first and second AND gates 140 and 141 are connected to a first inhibitor 160 and the outputs of the first and third AND gates 140 and 142 are connected to a second inhibitor 161. The output of the first inhibitor 160 is connected to the second and third OR gates 151 and 152. The output of the second inhibitor 161 is connected to the third OR gate 152. The first contact 201 of the gear shift selector 200 is connected to the OR gates 150 to 152. The contact 202 is connected to the first OR gate 150. The contact 204 is connected to the third OR gate 152, the contact 205 to the second and third OR gates 151 and 152 through an OR gate 170. AND gate 171 connects the contact 206 to the first and second OR gate 150 and 151.

The vehicle speed signal generator 101 actuates a vehicle speed comparator 180 which applies its output to the AND gate 171 to prevent overdrive of the engine when the gear shift selector is manually shifted to first gear with engine braking. An inhibitor 172 is interposed between the contacts 206 and the output terminal of the AND gate 171. The output terminal of the AND gate 171 also passes a signal to an input of an OR gate 170. Thus, in case of engine overdrive, the automatic transmission is automatically shifted to second gear. The three OR gates 150 to 152 operate the respective solenoid valves 40, 65, and 90 through drive circuits 190 to 192.

Figure 4:
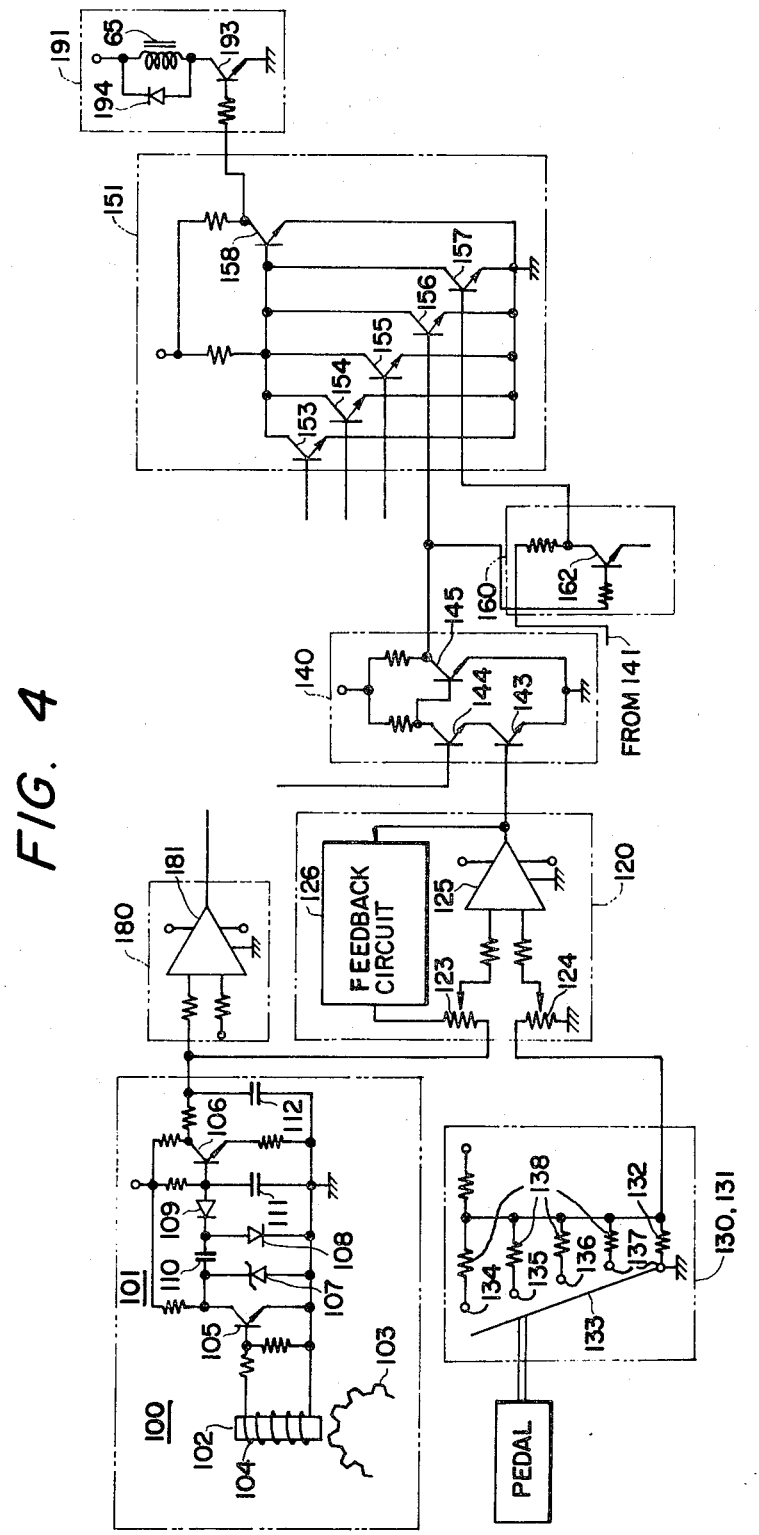
FIG. 4 is a circuit diagram illustrating details of the circuit in FIG. 3.

FIG. 4 is a detailed circuit diagram of at least a portion of the control system in FIG. 3 for the purpose of helping in the understanding of the operation of FIG. 3. In the tachometer 100 as illustrated in detail in FIG. 4, a toothed rotor 103 carried by the output shaft of the automatic transmission cuts the flux produced by a magneto 102 and a coil 104 so as to produce an alternating voltage. In the signal generator 101, when the signal from the coil 104 is 0 the transistor 105 is cut off and a capacitor 110 charged. Since the base potential of the transistor 106 is positive, the capacitor 111 is charged and the capacitor 112 is also charged by the collector current thereof.

A positive swing of the alternating voltage produced by the coil 104 renders the transistor 105 conductive. This discharges the capacitor 110 and lowers the base potential of the transistor 106 while increasing its collector potential. Therefore, an analog signal representing the frequency of the alternating voltage, that is, the vehicle speed produced by the action of the capacitors 111 and 112.

In the throttle opening detector 130 a movable contact 133 is coupled to an accelerator pedal and has one end grounded. Four stationary contacts 134 to 137 are sequentially opened as the throttle is opened wider. Resistors 138 connect the contacts 134 to 137 to a common line. The detector 130 also includes a base resistor 132. Because of the stationary contacts and the movable contacts, the output voltage is increased stepwise as the throttle opening is increased.

The comparator 120, which is similar in construction to the comparators 121 and 122, receives a first voltage corresponding to the vehicle speed from the signal generator 101, and a second voltage representing the throttle opening from the signal generator 131. A variable resistor 123 divides the voltage representing a vehicle speed while a variable resistor 124 divides a voltage representing a throttle opening. A differential amplifier 125 compares the divided input valtages to produce an output signal equal either to 1 or 0. A feedback circuit 126 establishes a hysteresis in order to prevent up or down hunting at shift points. The comparator 120 produces an output 0 when the signal representing a speed is equal to or higher than the signal representing the throttle opening, but produces a signal 1 when the former is less than the latter.

In the comparators 121 and 122, the voltage division ratios are different from that of the first comparator 120. When the divided voltages representing a wheel or vehicle speed are $E_{n1}$, $E_{n2}$, and $E_{n3}$, and the divided voltages representing a throttle opening are $E_{01}$, $E_{02}$, and $E_{03}$, respectively in the comparators 120, 121, and 122, their relations are as follows:

$$E_{01} = E_{02} - E_{03}$$

and $$E_{n1} > E_{n2} \, E_{n3}$$

In the vehicle speed comparator 180 a differential amplifier 181 compares a voltage representing the vehicle speed with a reference voltage. The differential amplifier produces a signal 1 when the vehicle speed voltage exceeds the reference voltage.

In the AND gate 140, which corresponds in construction to the AND gates 141 and 142, a transistor 143 receives the output signal from the comparator 120. A transistor 144 receives the signal generated when the contact 203 of the gear shift selector 200 is closed. When both of the transistors 143 and 144, or either of the transistors 143 or 144 receive no input signal, the transistors 143 and 144 are cut off so that a transistor 145 is rendered conductive so as to produce a 0 signal. However, when both input signals are applied to both transistors 143 and 144, these transistors are rendered conductive and the transistor 145 is cout off. As a result, the output signal of the AND gate 140 is 1. In the inhibitor 160, which is similar in construction to the inhibitor 161, a transistor 162 has a collector circuit connected to the output terminal of the AND gate 141. The base is connected to the output terminal of the AND gate 140. When the inhibitor 160 receives an output signal 1 from the AND gate 141 but receives no output signal from the AND gate 140, the transistor 162 is cut off so that the signal 1 is derived. On the other hand, when the AND gate 140 applies a signal 1 to the inhibitor 160, the transistor 162 is conductive so that it produces no output signals. Thus, the inhibitor 160 produces a 1 only if the input from 141 is 1 and from 140 is 0.

In the second OR gate 151, when all of the input signals are 0's, all of five input transistors 153 to 157 are cut off. However, transistors 158 is rendered conductive so that a 0 is produced at the output of the OR gate 151. When at least one 1 input signal is applied, the corresponding transistor is rendered conductive. This cuts off the transistor 158 to produce a 1 output. The three-input and two-input OR gates 150 and 170 are similar in construction to the OR gate 151, except that they have three and two input transistors respectively.

In the driver 191, which is substantially similar in construction to the drivers 190 and 192, a transistor 193 receives the input signal from the OR gate 151 at its base. The collector of the transistor 193, when the transistor is conductive, energizes the solenoid valve 165. A diode 194 prevents reverse current. The transistor 193 conducts in response to the input signal, thereby energizing the coil of the solenoid valve 65.

In operation, when the contact 201 of FIG. 3 is closed, the three OR gates 150 to 152 apply the signal from the contact 201 to the three driver circuits 190 to 192 to energize the solenoid valves 40, 65, and 90. This places the vehicle, or the system within the vehicle, in reverse gear as set forth in Table 2.

Closing of the contact 202 applies a signal directly through the OR gate 150 to the driver circuit 190 so that only the first solenoid valve 40 is energized. As can be seen from Table 2, this places the transmission in neutral.

Closing of contact 203 places the system in the automatic drive range, (the D range). A signal is then applied to the AND gates 140 to 142. The contacts 201, 202, and 206 of the gear shift selector 200 are off so that no input signal is applied to the OR gate 150. As a result, the forward gear is obtained with the first solenoid valve 40 deenergized.

When the relation between the vehicle speed detected by the tachometer 100 and the throttle opening detected by the detector 130 exhibits first gear, all of the output signals from the three comparators 120 to 122 are 1. Thus, the outputs to the AND gates 140 to 142 are also 1. However, the output signals of the two inhibitors 160 and 161 are 0's. As a result, the output signal of the AND gate 140, transmitted through the OR gate 151, energizes the solenoid valve 65.

In second gear, the comparator 120 produces a signal 0 whereas the comparators 121 and 122 produce 1 signals. As a result, the signal transmitted through the AND gates 140 and 142, and the inhibitors 160 and 161 and the OR gates 151 and 152, energize both the second and third solenoid valves 65 and 90.

When the conditions are right for third gear, only the comparator 122 produces an output signal 1. The AND gate 142 and the inhibitor 161 as well as the OR gate 152 transmit the 1 signal so that only the third solenoid valve 90 is energized.

When the conditions for fourth gear are applicable, all of the output signals of the comparators 120 to 122 are 0 signals so that all of the solenoid valves 40, 65, and 90 are deenergized.

Closing of the contact 204 applies a signal that energizes the third solenoid valve 90 through the OR gate 152. Since one input to the AND gates 140 to 142 is now 0, the automatic gear shift is released and the system placed in third gear.

Operation of the contact 205 places the system in second gear. The switch 205 applies the signal to the OR gates 170, 151, and 152 so that the second and third solenoid valves 65 and 90 are energized. In this case, one of the inputs to the AND gates 140 to 142 is also 0 so that the automatic gear shift is released and the system placed in second gear.

To place the system in first gear with engine braking, the contact 106 is closed. The signal from the contact 106 is applied to the AND 171 and the inhibitor 172. When the vehicle speed is in excess of a predetermined speed, the vehicle speed comparator 180 produces an output signal which is applied to the AND gate 171 so that the latter applies an output signal to the inhibitor 172. As a result, the output signal of the inhibitor becomes 0 but the output signal of the AND gate 171 is applied to the OR gate so as to place the system in second gear. However, when the vehicle speed is less than the predetermined speed, so that the output signal of the comparator 180 becomes 0, the output signal of the AND gate 171 also drops to 0. As a result, the vehicle slips out of second gear and the inhibitor 172 applies 1 signal which is transmitted through the OR gates 150 and 151 to the driver circuits 190 and 191. Thus, the first and second solenoid valves 40 and 65 are energized to place the vehicle in first gear with engine braking.

As described, the system according to the present invention shifts among four forward gears, one reverse gear, reverse gear with engine braking, and neutral by electronically controlling servo valves each composed of a solenoid valve and a shift valve. Therefore, as compared with conventional hydraulic control systems, the number of directional control valves used for gear shifts may be minimized. Moreover, the directional control valves may be of simple construction. Seizure of the valves may be prevented and power consumption is minimized as the number of solenoid control valves is decreased. Moreover, it is possible to eliminate the mechanical shift lever to that there are no undersired projections in the automobile interior. This is an important safety factor. Furthermore, shifting of gears may be accomplished with a higher degree of accuracy because of the logical combinations of the electrical system. According to an embodiment of the invention, a parking range is independently provided in any well known manner.

Operation of the solenoid valves in accordance with FIGS. 3 and 4 and table 2 actuates the corresponding valve of FIG. 2. These, in turn, operate the clutches of FIG. 1 in accordance with table 1. Thus, actuation of the valve 90, for example, causes valves 30, 50, and 70 to engage the clutches 4 and 15 and thereby place the system in third gear.

While embodiments of the invention have been described in detail, it will be obvious to those skilled in the art that the invention may be embodied otherwise without departing from its spirit and scope.

What is claimed is:

1. For a four-forward one-reverse automatic transmission wherein a gear transmission drives wheels in response to operation of a throttle and means including a plurality of hydraulic valves establish a drive ratio in the gear transmission, a control system comprising: means including three shift valves for supplying the hydraulic pressure and relieving the hydraulic pressure from the hydraulic valves according to a predetermined arrangement so that specific gear ratios occurs in response to operation of specific shift valves, first generating means selectively operable by an operator for generating electrical signals indicative of the condition in which the transmission is to operate, second generating means coupled to the throttle and the wheels for generating electrical signals representing an operating condition of the vehicle, logic means response to said first and second generating means for producing electrical values together indicating one of a number of gear shift positions for the transmission in response to the electrical signals from said two generating means, and driver means coupled to said logic means for responding to the electrical values and actuating said three shift valves so as to establish one of a number of specific gear ratios and forward and reverse directions, said first generating means including a plurality of contacts selectively closed by a driver in order to obtain one of six gear ranges; said six gear ranges including reverse gear, neutral, automatic drive range changeable from first to fourth gear, a fixed first gear, a fixed second gear, and a fixed third gear; said second generating means including sensor means coupled to the wheels for producing a signal indicative of the vehicle speed and detecting means responsive to the throttle for generating a signal representative of the load to be placed on the engine, said logic means including three comparators each coupled to said sensing means and said detector means for producing separate logic indications in response to the ratios of the signals applied to each comparator means, said ratios being different for each of the comparator means, said logic means including circuit means responsive to operation of the contacts and said three comparator means for generating the electrical values, said electrical values representing the range determined by the driver and the electrical signal representing the range automatically determined in response to said comparator means, and driving means including three solenoid valves responsive to said logic means, said solenoid valves being actuated in response to electrical values from said circuit means so as to actuate said shift valves.

2. A system as in claim 1, wherein said circuit means includes a plurality of AND gates each responsive to one of said comparator means and all responsive to operation of one of said contacts indicative of automatic drive, one of said AND gates producing the electrical values operating one of said solenoid valves, the other of said AND gates producing electrical values in cooperating with the first of said AND gates to operate another of said valves.

3. A system as in claim 2, wherein said circuit means including a pair of inhibitors each connected to said second and third AND gates, said inhibitors being connected to said first AND gate for inhibiting the output of said second and third AND gates when said first AND gate exhibits an output.

4. A system as in claim 3, wherein one of said inhibitors is connected to a solenoid valve other than the solenoid valve to which said AND gate is connected and a second of said inhibitors is connected to the solenoid valve to which said first AND gate is connected and to the solenoid valve to which the other inhibitor is connected.

5. A system as in claim 4, wherein said solenoid valves connected to said inhibitors establish four consecutive gears in the transmission on the basis of various combinations of operations of said solenoid valves.

6. A system as in claim 5, wherein respective ones of said contacts independently operate the valves connected to said inhibitor means.

7. A system as in claim 6, wherein said circuit means include means responsive to said contact means for energizing a combination of solenoid valves which operate the shift valves so as to place the transmission in first gear with engine braking.

8. A system as in claim 7, wherein said circuit means further includes speed comparator means responsive to said sensor means for comparing the speed of the vehicle with a predetermined speed, and inhibitor means responsive to the contact which initiates the first gear with braking and coupled to said speed comparator means for inhibiting the actuation of said shift valves by the solenoid valves producing first gear with braking and alternately selecting the solenoid valves and shift valves which produce second gear when the vehicle speed exceeds the predetermined value.

* * * * *